(12) United States Patent
Roberts (10) Patent No.: US 9,474,263 B2
(45) Date of Patent: Oct. 25, 2016

(54) ATTACHABLE IMPLEMENT HOLDER

(71) Applicant: Christopher M. Roberts, Hammond, NY (US)

(72) Inventor: Christopher M. Roberts, Hammond, NY (US)

( * ) Notice: Subject to any disclaimer, the term of this patent is extended or adjusted under 35 U.S.C. 154(b) by 0 days.

(21) Appl. No.: 14/693,002

(22) Filed: Apr. 22, 2015

(65) Prior Publication Data
US 2015/0316201 A1 Nov. 5, 2015

Related U.S. Application Data

(60) Provisional application No. 61/986,550, filed on Apr. 30, 2014.

(51) Int. Cl.
| | |
|---|---|
| A01K 97/10 | (2006.01) |
| F16M 13/02 | (2006.01) |
| A01K 97/08 | (2006.01) |
| A01K 97/04 | (2006.01) |
| A01K 97/06 | (2006.01) |
| A01K 97/05 | (2006.01) |
| B29L 31/00 | (2006.01) |
| A01K 99/00 | (2006.01) |

(52) U.S. Cl.
CPC .............. *A01K 97/10* (2013.01); *A01K 97/04* (2013.01); *A01K 97/05* (2013.01); *A01K 97/06* (2013.01); *A01K 97/08* (2013.01); *F16M 13/022* (2013.01); *A01K 99/00* (2013.01); *B29L 2031/7002* (2013.01); *B62B 2202/402* (2013.01); *Y02P 60/60* (2015.11); *Y02P 60/62* (2015.11); *Y10S 224/92* (2013.01); *Y10S 224/922* (2013.01); *Y10T 29/49828* (2015.01)

(58) Field of Classification Search
CPC ...................................................... A01K 97/10
See application file for complete search history.

(56) References Cited

U.S. PATENT DOCUMENTS

| | | | | |
|---|---|---|---|---|
| 358,307 A * | 2/1887 | Vermilye | ............... | A01K 97/10 248/302 |
| 545,024 A * | 8/1895 | Rogers | .................... | F16M 13/00 248/213.2 |
| 1,125,585 A * | 1/1915 | Menger | ................ | B65D 51/246 220/735 |
| 1,237,504 A * | 8/1917 | Graham | ............... | A47G 21/145 248/213.2 |
| 1,928,995 A * | 10/1933 | De Biasi | ................. | A47J 36/12 220/735 |
| 2,702,640 A * | 2/1955 | Leonard | ................. | B44D 3/123 211/65 |
| 3,659,369 A | 5/1972 | Hermanson | | |
| 3,737,131 A * | 6/1973 | Larson | ..................... | B25H 3/04 211/70.6 |
| 4,156,982 A | 6/1979 | Phillips, Jr. | | |

(Continued)

FOREIGN PATENT DOCUMENTS

| | | | | |
|---|---|---|---|---|
| CA | 2458293 A1 * | 7/2005 | ............. | A01K 97/10 |
| FR | 2896378 A1 * | 7/2007 | ............. | A01K 97/10 |
| GB | 2424567 A * | 10/2006 | ............. | A01K 97/10 |

*Primary Examiner* — Jonathan Liu
*Assistant Examiner* — Chiedu Chibogu
(74) *Attorney, Agent, or Firm* — Lawrence P. Trapani, Esq.

(57) ABSTRACT

An implement holder that removably attaches to a container, comprises a frame and a support. The frame contains a pair of open slots. The slots define an engagement tab therebetween. The tab flexes in response to a force. The support projects from one side of the frame and is configured to support an implement. The holder is attached to the container by (i) positioning the frame relative to the container such that the support is outside the container, (ii) aligning the slots of the frame on a rim of the container such that the tab is inside the rim, and (iii) pushing the frame onto the rim to cause the tab to flex and allow the frame to slidably engage a wall of the container along the slots, such that the tab is biased against the wall and securely holds the frame to the container.

10 Claims, 11 Drawing Sheets

(56) References Cited

U.S. PATENT DOCUMENTS

| | | | | |
|---|---|---|---|---|
| 4,299,340 | A | * | 11/1981 | Hrytzak .................. B65D 25/48 222/189.07 |
| 4,594,805 | A | * | 6/1986 | McClelland ........... A01K 97/10 248/520 |
| 4,632,347 | A | * | 12/1986 | Jurgich ................ A47G 21/145 211/70.6 |
| 4,846,076 | A | * | 7/1989 | Menges, Sr. ........... A01K 97/22 108/42 |
| 4,867,332 | A | * | 9/1989 | Mains ...................... B25H 3/04 206/372 |
| 4,867,410 | A | * | 9/1989 | Jurgich .................. A47G 21/14 211/70.7 |
| 4,896,806 | A | * | 1/1990 | Sanchez, Jr. ........... A01K 97/10 224/200 |
| 5,261,577 | A | * | 11/1993 | Goldstein ................ B44D 3/12 220/23.83 |
| 5,301,911 | A | * | 4/1994 | Beauchemin ........ A44B 11/125 108/152 |
| 5,303,500 | A | * | 4/1994 | Luukonen ............. A01K 97/01 206/315.11 |
| 5,335,440 | A | | 8/1994 | Williams |
| 5,491,923 | A | | 2/1996 | Zingrone |
| 5,582,376 | A | * | 12/1996 | Thompson ........... A47F 5/0846 211/94.01 |
| 5,730,405 | A | * | 3/1998 | Nichols, IV .......... A47J 43/287 248/213.2 |
| 5,853,157 | A | | 12/1998 | O'Donnell |
| D405,500 | S | | 2/1999 | Burby et al. |
| 6,170,189 | B1 | * | 1/2001 | Klein ..................... A01K 97/10 43/17 |
| 6,175,987 | B1 | * | 1/2001 | Harvey .................. A46B 17/02 15/246 |
| 6,193,125 | B1 | * | 2/2001 | Grover ...................... A45F 5/02 224/195 |
| 6,253,484 | B1 | | 7/2001 | O'Connor |
| 6,374,532 | B1 | * | 4/2002 | Klein ..................... A01K 97/01 43/17 |
| 6,715,230 | B1 | * | 4/2004 | Klein ..................... A01K 97/01 43/54.1 |
| 6,718,682 | B1 | | 4/2004 | Seitsinger et al. |
| D501,910 | S | | 2/2005 | Kirby |
| 7,036,267 | B2 | * | 5/2006 | Klein ..................... A01K 97/01 43/54.1 |
| 7,156,136 | B1 | * | 1/2007 | Kulas .................. A47J 43/0727 141/331 |
| 7,175,031 | B2 | * | 2/2007 | Matthews ................ B25H 3/04 211/70.6 |
| 7,254,915 | B2 | | 8/2007 | Mrotek |
| 7,320,196 | B2 | | 1/2008 | Diederichs |
| D589,588 | S | | 3/2009 | Begaye |
| 7,665,494 | B2 | * | 2/2010 | Kulas .................. A47J 43/0727 141/338 |
| 7,746,727 | B2 | | 6/2010 | Bacarella et al. |
| 8,162,012 | B2 | * | 4/2012 | Kulas ...................... A47J 43/07 141/338 |
| 8,783,534 | B1 | * | 7/2014 | Marshall ................ A45F 5/021 224/269 |
| 9,085,379 | B2 | * | 7/2015 | Cummins ................ B65B 3/06 |
| 2004/0237374 | A1 | * | 12/2004 | Klein ..................... A01K 97/01 43/21.2 |
| 2005/0145664 | A1 | * | 7/2005 | Fappiano ............... A01K 97/10 224/678 |
| 2009/0278005 | A1 | * | 11/2009 | Bacarella ............... A01K 97/00 248/205.1 |
| 2010/0122487 | A1 | * | 5/2010 | Snider .................... A01K 97/10 43/19.2 |
| 2013/0025180 | A1 | * | 1/2013 | Norman ................. A01K 97/08 43/26 |
| 2013/0227875 | A1 | * | 9/2013 | DeSpiegelaere ....... A01K 97/01 43/54.1 |

* cited by examiner

ATTACHABLE IMPLEMENT HOLDER

CROSS-REFERENCE TO RELATED APPLICATIONS

This application claims the benefit of U.S. Provisional Application No. 61/986,550, filed Apr. 30, 2014, which is incorporated herein by reference.

BACKGROUND OF THE INVENTION

1. Field of Invention

The present invention relates generally to a holder for supporting implements, and more particularly to such a holder that removably attaches to a bucket, pail, can, pan, tray, drum or other container.

2. Background Art

In various trades and pastimes, implements are sometimes used in conjunction with containers, such as, e.g., a bucket or pail. An example of such a trade is painting and decorating, where the implement may be a brush and the container may be a pail containing paint, stain, or other decorative coating. An example of a pastime is fishing, where the implement may be a fishing rod, tackle box, or fish finder and the container may be a bucket or pail for holding caught fish and/or bait. The connection between implements and containers has not gone unnoticed and attempts have been made to provide an implement holder that attaches to a container. For example, see the following U.S. Pat. No. 3,659,369 to Hermanson; U.S. Pat. No. 7,746,727 to Bacarella et al.; U.S. Pat. No. 6,253,484 to O'Connor; U.S. Pat. No. 6,718,682 to Seitsinger et al.; U.S. Pat. No. 7,320,196 to Diederichs; U.S. Pat. No. 5,853,157 to O'Donnell; U.S. Pat. No. 5,335,440 to Williams; U.S. Pat. No. 5,491,923 to Zingrone; and U.S. Pat. No. 7,254,915 to Mrotek. The patents to Seitsinger et al. (FIG. 5), Diederichs (FIG. 8), O'Donnell (FIG. 8), and Mrotek (FIG. 1) disclose various types of holders for fishing rods and paint brushes that clip onto the rim of a bucket. These holders support the implement in such a way that it projects over the opening of the bucket and thus potentially interferes with access to the bucket. In addition, the rest points for the implement are closed or partially closed, requiring some manipulation of the implement during placement on or removal from the rest point or points of the holder. This can be especially disadvantageous, for example, in fishing—when a fish strikes, the fisherman should not be concerned with manipulating the fishing rod before lifting it to set the hook.

The patents to Williams (FIGS. 1, 2 & 7) and Zingrone (FIGS. 1 & 4) disclose fishing rod holders that mount to a bucket by means of bolts or threaded rods that penetrate the wall of the bucket and are secured by nuts on the inside of the bucket. These holders do keep the implement (i.e., fishing rod) away from the opening of the bucket, but have the distinct disadvantage of requiring a permanent modification of the bucket, i.e., drilling or puncturing holes in the bucket wall for the bolts or threaded rods. Further, these holders include at least one closed or partially closed rest point that would require some manipulation of the fishing rod when placing it on or removing it from the holder.

The patents to Hermanson (FIGS. 1 & 2), Bacarella et al. (FIGS. 1 & 2), and O'Connor (FIGS. 1 & 2) disclose holders that hook onto the rim of a bucket and keep the implement clear from the opening of the bucket. However, in Hermanson, the holder comprises a number of parts connected together with fasteners and requires a pair of set screws to secure the holder to the bucket. Further, Hermanson contains a partially closed rest point for the butt end of the fishing rod, which would require some manipulation before the rod could be lifted. Bacarella et al. discloses a pair of toed-in strap hooks that hook over the rim of the bucket. In Bacarella et al., the rest point for the fishing rod is closed, requiring manipulation of the rod before it can be lifted. Also, the holder in Bacarella et al. is constructed of several parts fastened together with rivets. Finally, in O'Connor, the holder contains a partially closed rest point for a fishing rod, which may require manipulation of the rod during lifting or may interfere with the fishing line.

The stability of the attachment of a holder to a container is a concern. The success of the holder may depend on how well it is secured to the container and how stable it remains during use. In the patent to Hermanson, a relatively secure attachment is achieved, but it requires the use additional hardware in the form of two set screws. There is a chance that set screws could loosen during use. In the patent to Bacarella et al., only a pair of narrow strap hooks hold the holder to the bucket. In the patent to O'Connor, the holder is hooked onto a bucket using only a single flat hook defined by two legs (12, 28) and a slot (42) between them. The patent to Seitsinger et al. employs a pair of "brackets" 30, 32 that are adjustable for each container, but then must be tightened with screws and nuts. In the patent to Diederichs, the holder is merely held onto the container by an open slot cutout of a tubular body. In O'Donnell, the holder clips onto the rim of the container using only a single resilient clip (32, 36). In the patent to Mrotek, a spring-loaded alligator or binder clip mechanism is used to establish only a single point of attachment to the bucket. Finally, the patents to Williams and Zingrone offer secure attachments to the bucket, but they require penetration of the bucket walls and hardware in the form of nuts, washers, and bolts or threaded rods. Despite the several different attachment mechanisms proposed in these prior patents, a need still remains for a simple and secure mechanism for removably attaching an implement holder to a container.

Other fishing rod holders not associated with a container are disclosed in the following U.S. Pat. No. 4,156,982 to Phillips, Jr.; U.S. Pat. No. D589,588 to Begaye; U.S. Pat. No. D501,910 to Kirby; and U.S. Pat. No. D405,500 to Burby et al. The patent to Phillips, Jr. discloses a holder that mounts to a railing using a clamping screw. The holder contains an open v-shaped rest point 16 and a closed rest point 14, and is constructed of several pieces joined together. The patent to Begaye discloses a design for a holder, meant to be anchored into the ground. The holder includes an open v-shaped rest point and a closed rest point. It is constructed of what appears to be at least four pieces. The patent to Kirby discloses a design for a stand-alone holder including a flat base containing an elongated closed notch, which functions as a handle. Lastly, the patent to Burby et al. discloses a design for a stand-alone holder with two open rest points at different heights. The holder appears to be constructed of multiple tubular pieces and connector elements. Notwithstanding the various proposed implement holders discussed in this Background Art section, a need still remains for an effective, simple, and low-cost holder, especially one that can be easily and securely (removably) attached to an associated container and remain secure during long periods of use.

OBJECTS AND SUMMARY OF THE INVENTION

It is therefore an object of the present invention to overcome the problems associated with prior implement holders, especially those that are to be attached to a container.

It is another object of the present invention to provide an implement holder that removably attaches to a container such as, for example, a bucket, pail, can, pan, tray or drum.

It is a further object of the present invention to provide an implement holder that includes an attachment mechanism, which engages the rim of the container and easily and firmly, removably attaches the holder to the container.

It is yet another object of the present invention to provide an implement holder that includes an attachment mechanism, which removably attaches the holder to the container without having to modify or otherwise alter the container.

It is yet a further object of the present invention to provide a holder that supports an implement away from the opening of the container and does not interfere with the opening.

It is still another object of the present invention to provide an implement holder that is made of a single piece of sheet material and formed as a single part, and that requires no additional parts or hardware for use.

It is still a further object of the present invention to provide, in at least one embodiment, a holder having at least two open rest points for an implement, such that the implement can be manually placed in or lifted from the rest points without manipulation of the implement or interference from the holder's structure.

It is yet still another object of the present invention to provide, in at least one embodiment, a holder having at least one implement rest point that is in the form of a v-shaped notch, which allows a fishing pole strung with fishing line to rest in the notch without interfering with the fishing line extending through the notch.

It is yet still a further object of the present invention to provide an implement holder that includes a handle to allow easy manipulation of the holder while attaching or removing the holder from a container.

It is yet still a further object of the present invention to provide an implement holder on which accessories may be attached, such as, e.g., a cup-holder, tool tray, bait box, tackle tray or minnow pail.

These and other objects are attained in accordance with the present invention, wherein there is provided an implement holder of the type that removably attaches to a container. The container has a wall with a rim that defines an opening to the container. The implement holder comprises a frame and a support. The frame has a bottom edge and contains a pair of slots open at the bottom edge. The slots are spaced apart from each other and define an engagement tab therebetween. The engagement tab is a resilient member that flexes in response to a force. The support projects from one side of the frame and is configured to support at least one implement. The holder is removably attached to the container by: (i) positioning the frame relative to the container such that the support is outside the container and away from the opening; (ii) aligning the pair of slots of the frame on the rim of the container such that the engagement tab is on the inside of the rim; and (iii) pushing the frame onto the rim to cause the engagement tab to flex and allow the frame to slidably engage the wall of the container along the pair of slots, such that the engagement tab is biased against the wall inside of the container and securely holds the frame to the container.

The support of the implement holder may be configured in various different ways to support different types of implements. For example, the support may be configured to hold a fishing rod in a position for fishing. In another example, the support may be configured to hold a paint brush or other tool. In a further example, the support may be configured to hold a box or tray of tools or hardware.

In some embodiments of the implement holder, the fame may contain a handle. It is preferred that the handle be fashioned in the frame by cutting an elongated hole in the frame near the top. The hole must be large enough to allow a hand to grasp the frame with the fingers extending comfortably through the hole. The handle facilitates the manipulation of the holder and the process of attaching or removing the holder from the container. In some embodiments, the implement holder (including frame and support) is made of a single piece of sheet material (e.g., galvanized or stainless steel, aluminum, or ABS plastic) formed as a single part, requiring no additional parts or any hardware.

In one particular embodiment, the implement holder is configured for supporting a fishing rod in a position for fishing. The support includes a pair of flat arms cantilevered from the frame. Each arm contains an open rest point for the fishing rod, and the rest points are aligned with one another, so that the rod is supported in a rest (or fishing) position on two open rest points. The open rest points allow the rod to be manually placed in or lifted from the rest position without manipulation of the rod or interference from the support's structure. Open rest points are preferred, because when a fish strikes, the fisherman should not have to manipulate the rod before lifting it to set the hook. In this embodiment, one arm is lower (e.g., 10 inches lower) than the other arm relative to the frame, such that the fishing rod is at an angle and pointing upward in the rest (or fishing) position. Each rest point is preferably configured in the form of a v-shaped notch, which allows a fishing pole to rest in the notch without interfering with the fishing line extending through the notch. As an addition to this embodiment, an accessory holder may be attached or otherwise supported on the frame or an arm of the implement holder. For example, a cup-holder, tool or tackle tray, bait box, or minnow pail may be hooked onto the frame or arm.

BRIEF DESCRIPTION OF THE DRAWING

Further objects of the present invention will become apparent from the following description of preferred embodiments, with reference to the accompanying drawing, in which.

DETAILED DESCRIPTION OF THE PREFERRED EMBODIMENT

Figure 1:
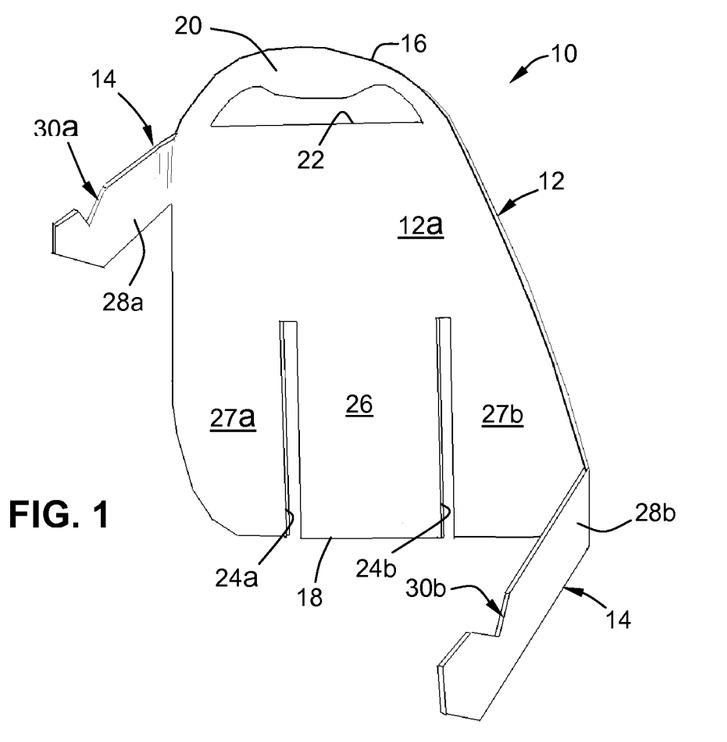
FIG. 1 is a perspective view of one embodiment of the present invention, configured as a fishing rod holder to be removably attached to one side of a bucket, pail or other container.

Referring now to FIG. 1, there is shown an exemplary embodiment of the present invention, in the form of a fishing rod holder 10. Holder 10 comprises a frame 12 and a fishing rod support 14. Frame 12 is generally flat and has a top end 16 and a bottom edge 18. A handle 20 is fashioned in frame 12 by cutting an elongated hole 22 in frame 12, near top end 16. Hole 22 must be large enough (e.g., 5 inches) to allow a hand to grasp handle 20 and extend the fingers of the hand comfortably through hole 22. Handle 20 facilitates the manipulation of holder 10 and the process of attaching or removing holder 10 to a container (see FIGS. 7A-7C). Frame 12 contains a pair of elongated slots 24a and 24b that are open at bottom edge 18 and extend upward (in FIG. 1) through frame 12 by a sufficient length (e.g., 6 inches). Slots 24a, 24b are of sufficient width to engage the rim or lip of a container (e.g., about a quarter inch). Slots 24a, 24b are substantially parallel to each other and are spaced apart from each other by a sufficient width (e.g., 5 inches) to define a substantial engagement tab 26. The dimensions of tab 26 may be, for example, five inches wide and six inches long. In this embodiment, tab 26 is an integral part of frame 12, being partially cut therefrom. Tab 26 is a resilient member that flexes in response to a force, e.g., a downward pushing force of the frame onto the rim of a container (see FIGS. 7A-7C). Slots 24a, 24b also define (at least in part) counter tabs 27a and 27b, which counteract the biasing force of tab 26 when holder 10 is attached to the container.

Support 14 includes a pair of flat support arms 28a and 28b projecting out from a front side 12a of frame 12. In this embodiment, arms 28a, 28b are integrally formed with frame 12. Arms 28a and 28b contain open rest points 30a and 30b, respectively, for supporting a fishing rod. Rest points 30a, 30b are aligned with each other and thus are each spaced from frame 12 by the same distance (e.g., about 4.5 inches). Arm 28a is positioned higher on frame 12 than arm 28b (e.g., about 10 inches higher), so that a fishing rod can be supported at an angle and pointed upward in a fishing (or rest) position (see FIG. 2). Rest points 30a, 30b are each preferably configured in the form of a v-shaped notch (as shown), which allows a fishing rod to rest in the notch without interfering with the fishing line extending through the notch (see FIG. 4).

Figure 2:
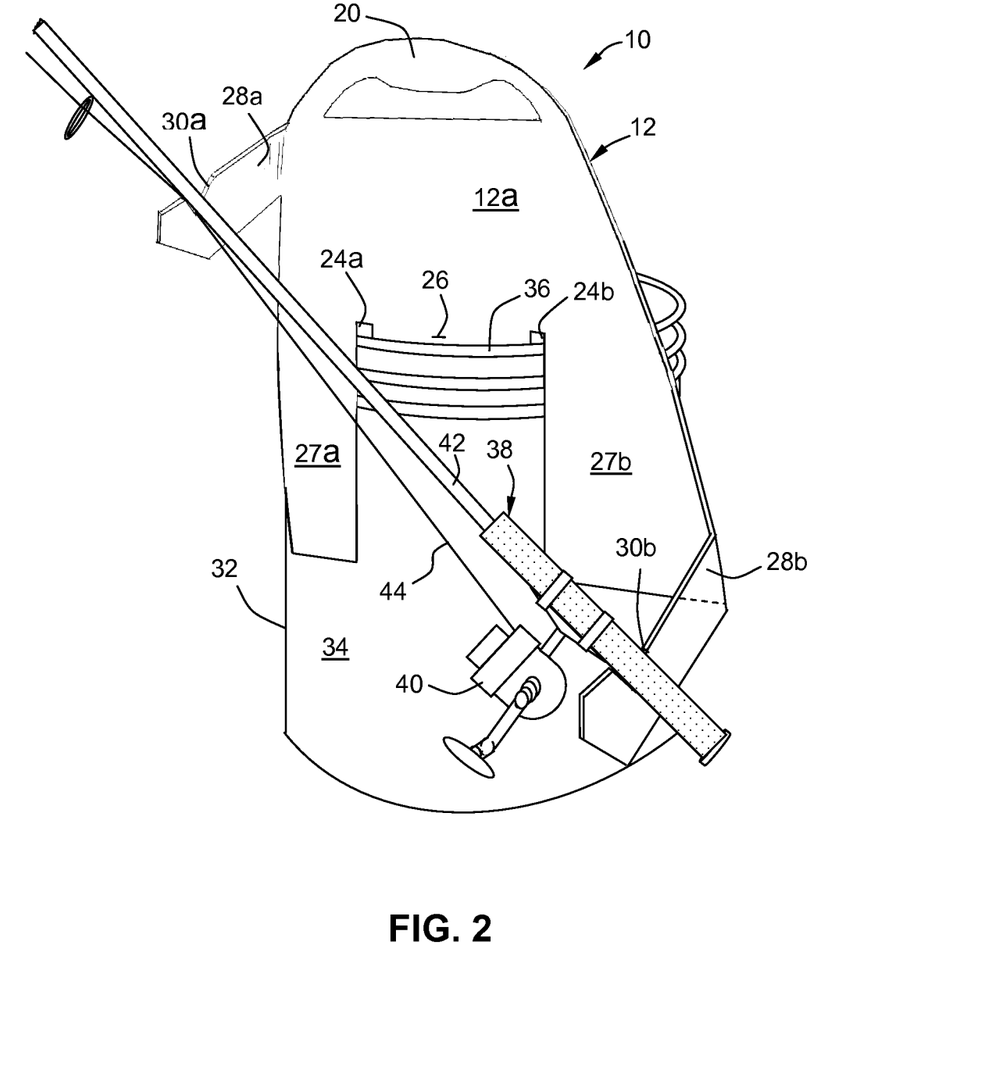
FIG. 2 is a front perspective view of the fishing rod holder of FIG. 1 attached to one side of a bucket and holding a fishing rod in a fishing position on upper and lower support arms.
Figure 3:
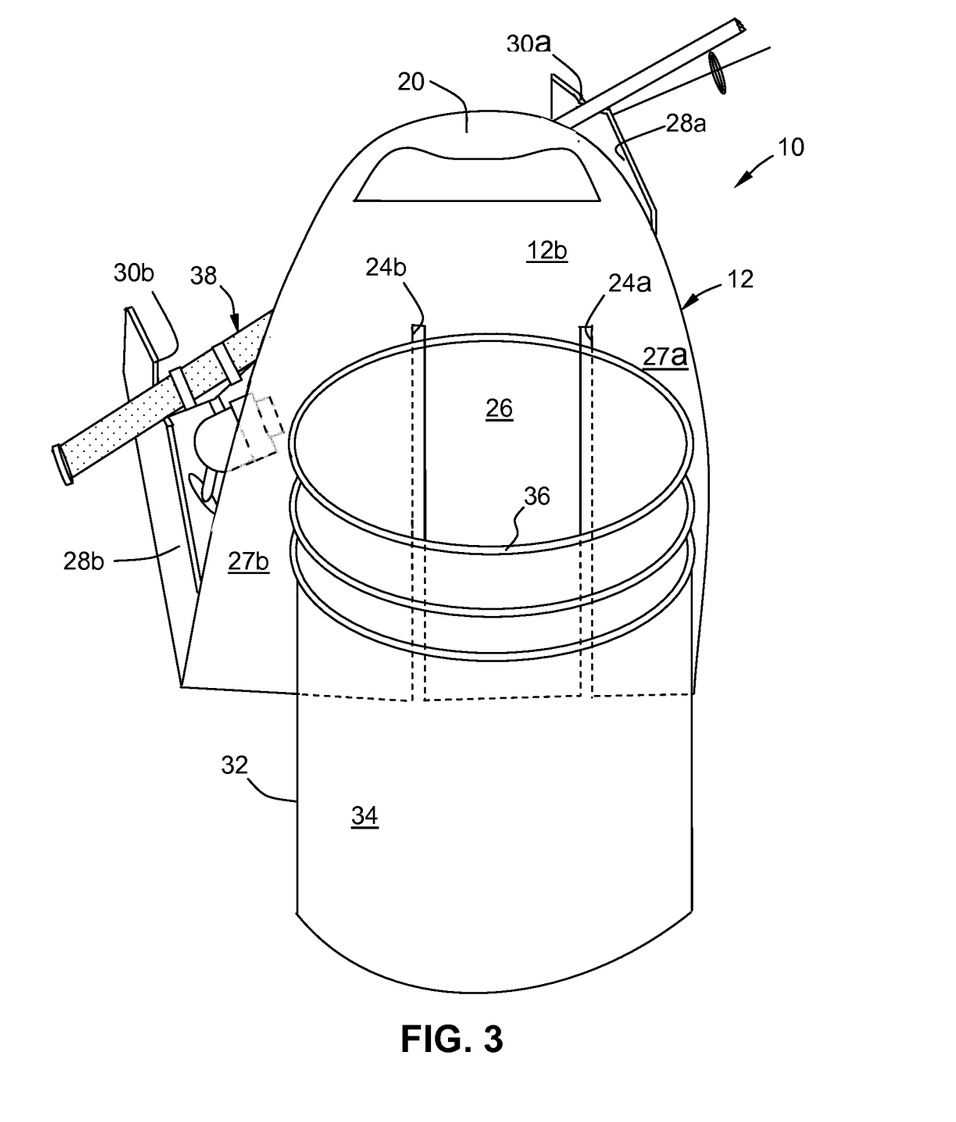
FIG. 3 is a rear perspective view showing the fishing rod holder of FIG. 1 attached to one side of a bucket and holding a fishing rod in a fishing position.

Referring now to FIGS. 2 and 3, fishing rod holder 10 is shown removably attached to a bucket or other container 32. Container 32 has a wall 34 and a rim 36. As shown, frame 12 has been pushed down onto rim 36 and made to engage wall 34 in a tight secure fit. Tab 26 is biased against the interior of wall 34 (FIG. 3) and counter tabs 27a, 27b provide a counteracting bias against the exterior of wall 34 (FIG. 2). A fishing rod 38 has been placed onto holder 10 and rests in an upright fishing position. A fishing position is a position of the rod that is suitable for actual fishing after a cast has been made into the water. Fishing rod 38 includes a reel 40, a pole 42 and fishing line 44. Rod 38 rests on open rest points 30a and 30b, such that reel 40 is situated between arms 28a and 28b (and preferably close to lower arm 28b). The open nature of rest points 30a, 30b allow rod 38 to be manually placed in or lifted out of holder 10 without manipulation of rod 38 or interference from any structural part of holder 10. "Without manipulation" of rod 38 means without having to move the rod other than to place it down or lift it up from the rest points. Manipulation may involve, for example, sliding the rod out of or into a holder, tilting the rod, moving the grip or pole sideways, forward or backward, etc. Open rest points 30a, 30b allow the fisherman, when a fish strikes, to simply grab rod 38 and lift it up to set the hook. He or she is not concerned with manipulating the rod first before lifting it.

Figure 4:
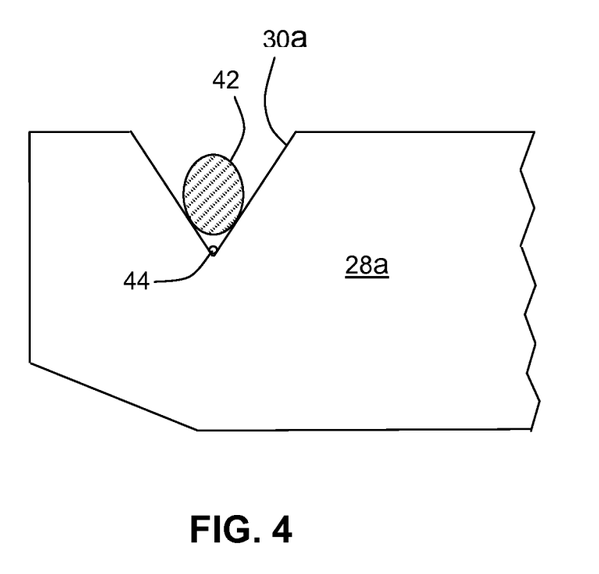
FIG. 4 is an enlarged fragmented view of the upper arm of the fishing rod holder of FIG. 2, showing the fishing pole and fishing line (in section) situated in an open, v-shaped rest point.

Referring now to FIG. 4, an enlarged fragmented view of upper arm 28a is shown with its v-shaped rest point 30a. Pole 42 and line 44 are shown in section to illustrate how the v-shape of rest point 30a helps prevent pole 42 from interfering with line 44. Pole 42 is shown resting in the notch of point 30a and line 44 remains free of pole 42. This configuration helps prevent entanglement of line 44 with pole 42 and also with upper arm 28a. The v-shaped notch is preferably symmetric. Typical dimensions are a one inch length for each slope of the notch and the notch is about three-quarters of an inch deep.

Figure 5:
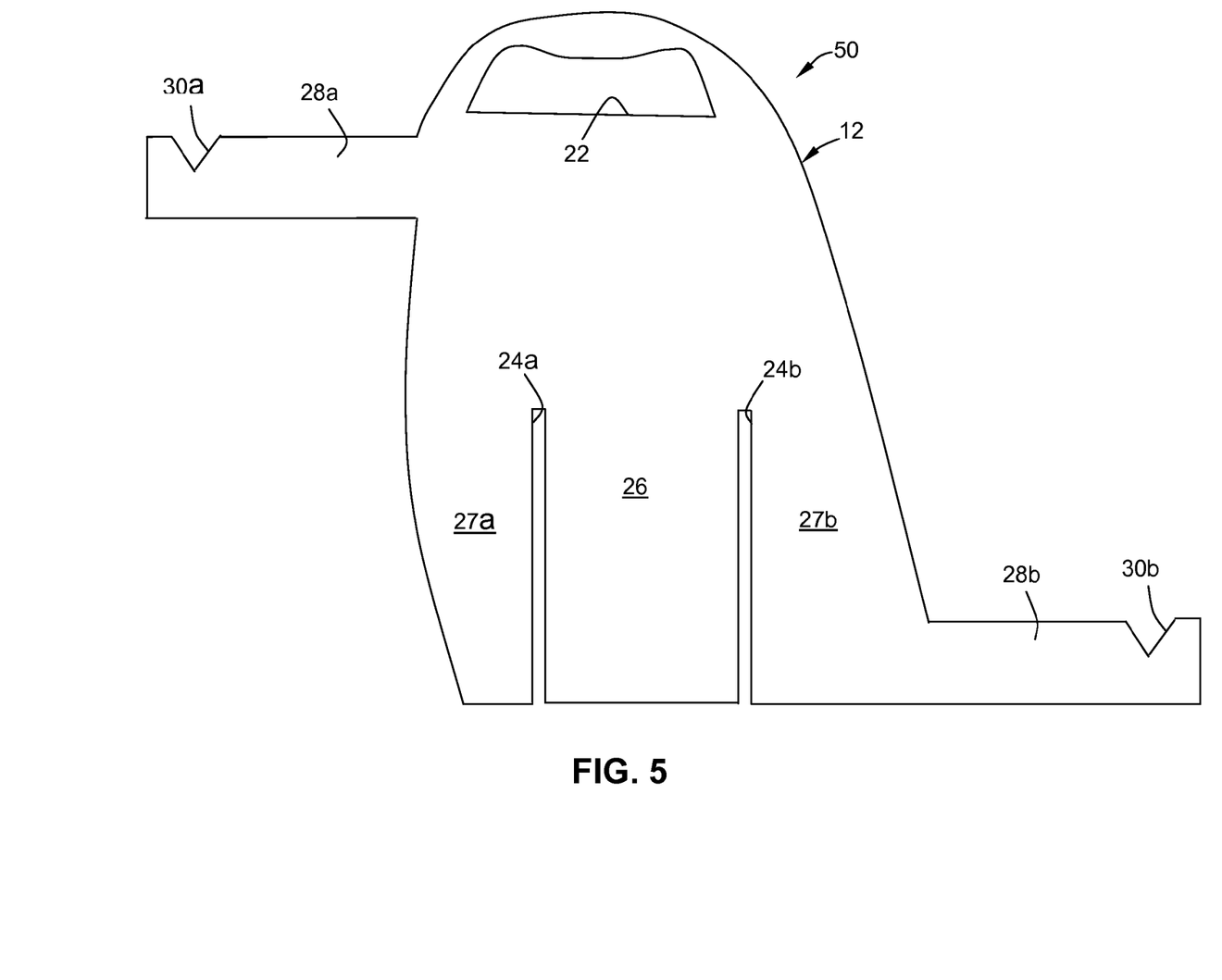
FIG. 5 is an elevation view of a workpiece of sheet material and pre-cut or stamped according to a particular pattern and ready to be formed into the fishing rod holder of FIG. 1.
Figure 6:
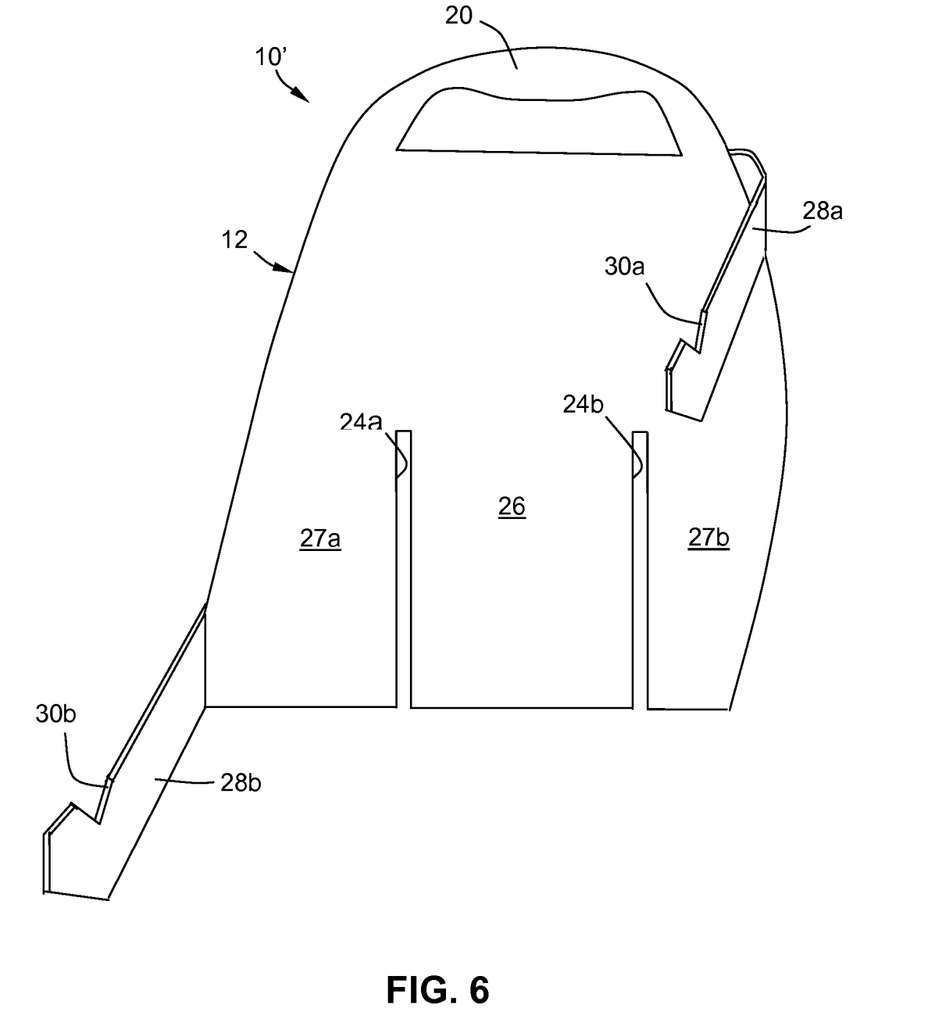
FIG. 6 is a perspective view of a fishing rod holder similar to the holder of FIG. 1, except that it is configured to attach to the other side of the bucket, pail or other container.

Referring now to FIG. 5, a workpiece 50 made of some type of sheet material is pre-cut, stamped, molded or formed according to a particular pattern, which is represented by the general outline of workpiece 50. The preferred sheet material is 16-gauge galvanized steel, although 16-gauge stainless steel or aluminum would be suitable. One-eighth inch aluminum sheet may also be used. The sheet material may also be plastic, such as, for example, an ABS plastic. It is preferred that holder 10 be made from a single piece of sheet material (such as from workpiece 50) and then formed as a single part, requiring no other parts or any hardware. Workpiece 50 may be cut from a sheet of galvanized steel using a jigsaw or nibbler. Frame 12, upper and lower arms 28a, 28b, and v-shaped rest points 30a, 30b are first cut as part of a general outline of the workpiece. Then slots 24a, 24b and hole 22 are cutout. The finished workpiece (FIG. 5) can then be easily formed into a fishing rod holder, such as holder 10. This is done by simply bending arms 28a, 28b to one side or the other. If the arms are bent out of the page in FIG. 5, the resulting holder will be like holder 10, which would attach to the left side of bucket 32 (as viewed from behind the bucket). If the arms are bent into the page in FIG. 5, the resulting holder would look like a fishing rod holder 10' shown in FIG. 6. As can be envisioned, holder 10' would attach to the right side of bucket 32 (as viewed from behind the bucket). Thus, the single workpiece 50 is able to produce both "left-handed" and "right-handed" fishing rod holders.

Further refinements may be made to the finished implement holder of the present invention. For instance, a plastic or rubber grommet-like insert may be fitted in opening 22 to cover the edges of opening 22 (FIG. 1) and make holder 10 more comfortable to handle. In addition, or alternatively, a plastic or rubber shroud or cover may be fitted over handle 20. Also, a plastic coating or sheath may be applied to engagement tab 26 to reduce friction between tab 26 and a container to which holder 10 is to be attached.

Figures 7A, 7B, 7C:
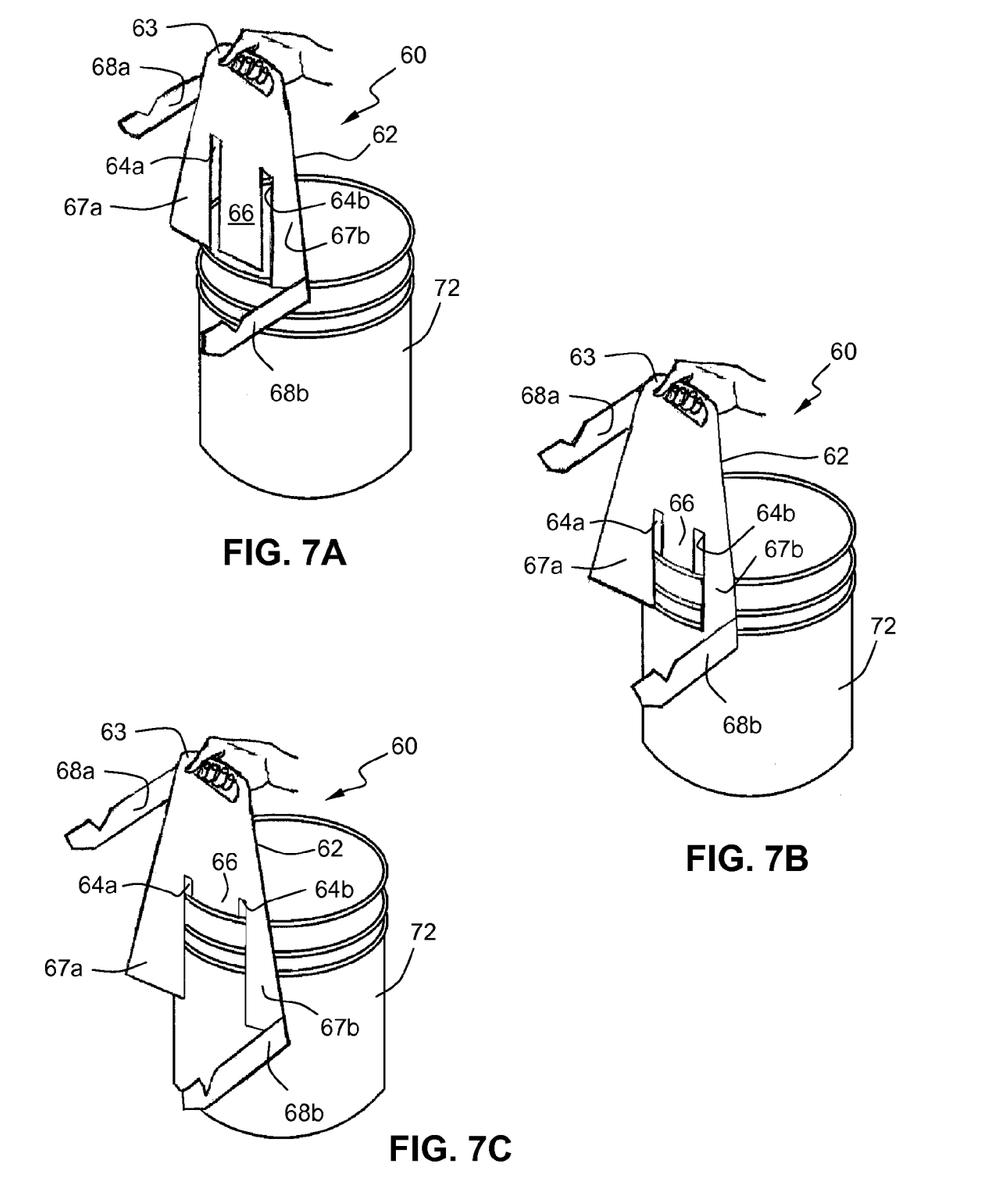
FIGS. 7A thru 7C are a series of diagrammatic views illustrating the process of attaching the fishing rod holder to a bucket.

The process of removably attaching an implement holder of the present invention to a container will now be described with reference to FIGS. 7A-7C. In FIGS. 7A-7C, an implement holder 60 is in the form of a fishing rod holder. Holder 60 has a frame 62 containing a handle 63 and a pair of engagement slots 64a and 64b. Slots 64a, 64b define an engagement tab 66 and a pair of counter tabs 67a and 67b. Holder 60 also includes a pair of fishing rod support arms 68a and 68b, and each of the arms contains a v-shaped open rest point for the fishing rod. In FIGS. 7A-7C, holder 60 is being attached to a bucket 72 typically used for fishing. In FIG. 7A, frame 62 is grasped by handle 63 and placed onto the rim of bucket 72, such that support arms 68a, 68b are outside of bucket 72 and pointing away from the bucket's opening. Engagement slots 64a, 64b are aligned to register with the rim of bucket 72, such that engagement tab 66 is situated just inside the rim and counter tabs 67a, 67b are just outside the rim. In FIG. 7B, frame 62 is pushed down onto the rim, causing tab 66 to flex slightly to the interior of bucket 72. As frame 62 continues to be pushed down, the bucket wall engages slots 64a, 64b and frame 62 slides down the wall. Tab 66 slides along the interior of the wall and counter tabs 67a, 67b slide along the exterior of the wall. In FIG. 7C, frame 62 is pushed down as far as it will go to fully engage bucket 72. The attachment of holder 60 is complete. Tab 66 is strongly biased against the interior of the bucket wall and counter tabs 67a, 67b provide a counteracting bias against the exterior of the wall. Holder 60 is thus firmly secured to bucket 72.

Figure 8:
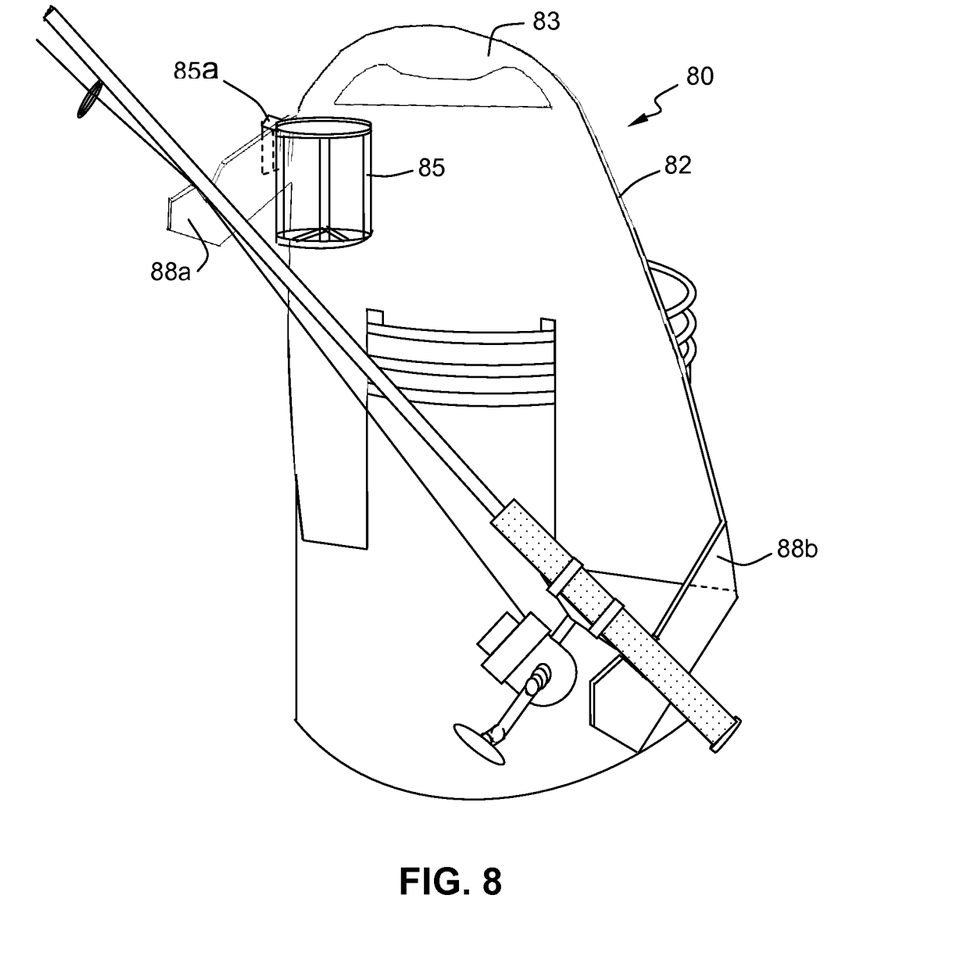
FIG. 8 is a perspective view of the fishing rod holder of FIG. 1, showing a cup-holder accessory hooked onto the upper arm.
Figure 9:
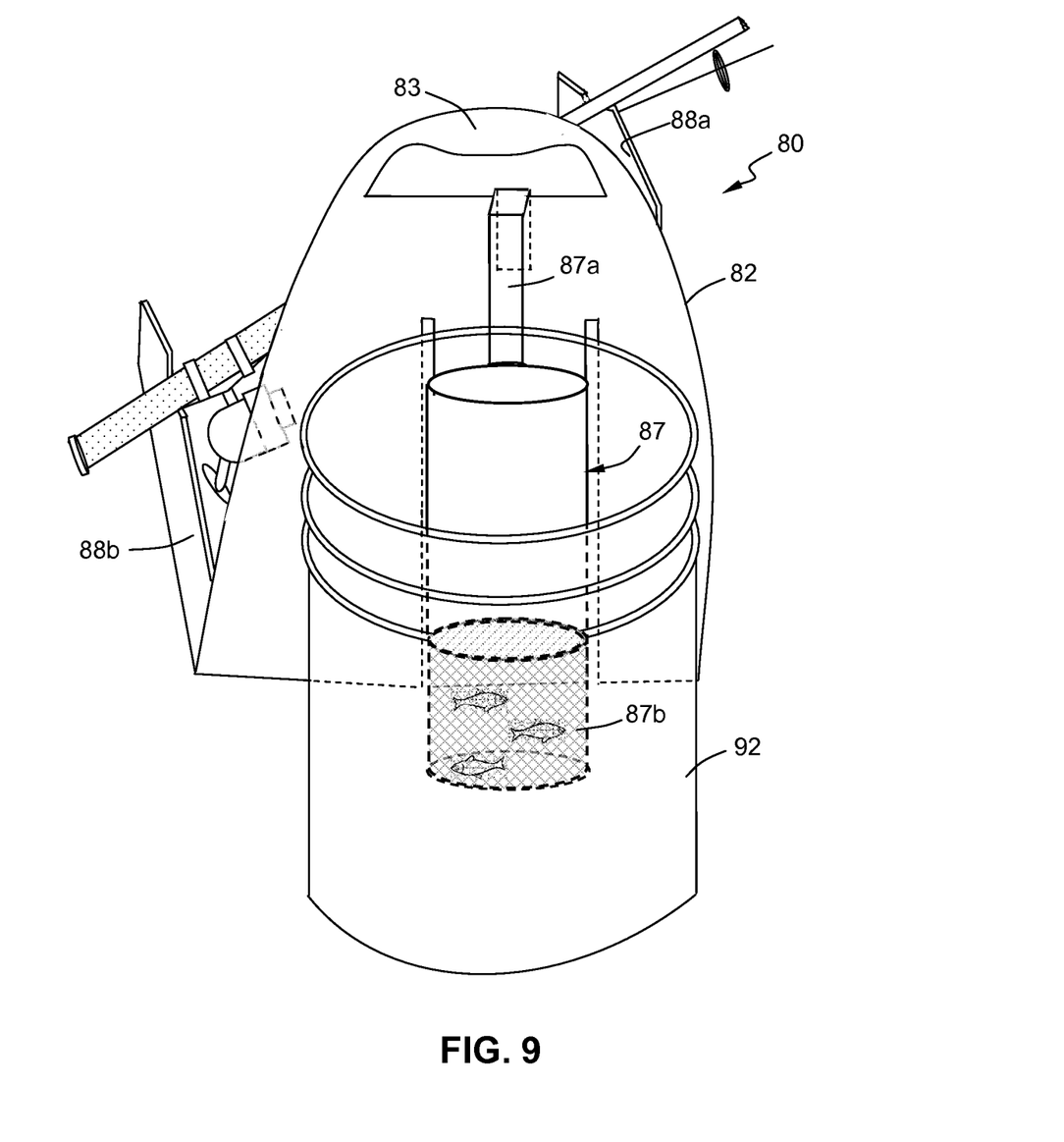
FIG. 9 is a perspective view of the fishing rod holder of FIG. 3, showing a minnow pail accessory hooked onto the frame.

Referring now to FIGS. 8 and 9, the additional feature of attaching or supporting accessories on an implement holder of the present invention is illustrated. In FIGS. 8 and 9, a fishing rod holder 80 includes a frame 82, a handle 83, and a pair of fishing rod support arms 88a and 88b. In FIG. 8, an accessory 85 in the form of a cup-holder is hooked onto support arm 88a, using a resilient hook-like clip 85a. The cup-holder can be sized to hold most standard hot or cold beverage cups and cans. Accessory 85 can be configured as any useful receptacle, such as, e.g., a bait box, tool box or tray, fishing tackle box or tray, or even a cell phone or camera holder. In FIG. 9, fishing rod holder 80 is attached to a fishing bucket 92. An accessory 87 in the form of a minnow pail is hooked onto frame 82 through the opening of handle 83. The minnow pail is hooked onto frame 82 with a metal strap hook 87a, which is attached to the pail. The minnow pail includes a basket 87b for holding minnows and is intended to be submerged in water contained in bucket 92.

Figure 10:
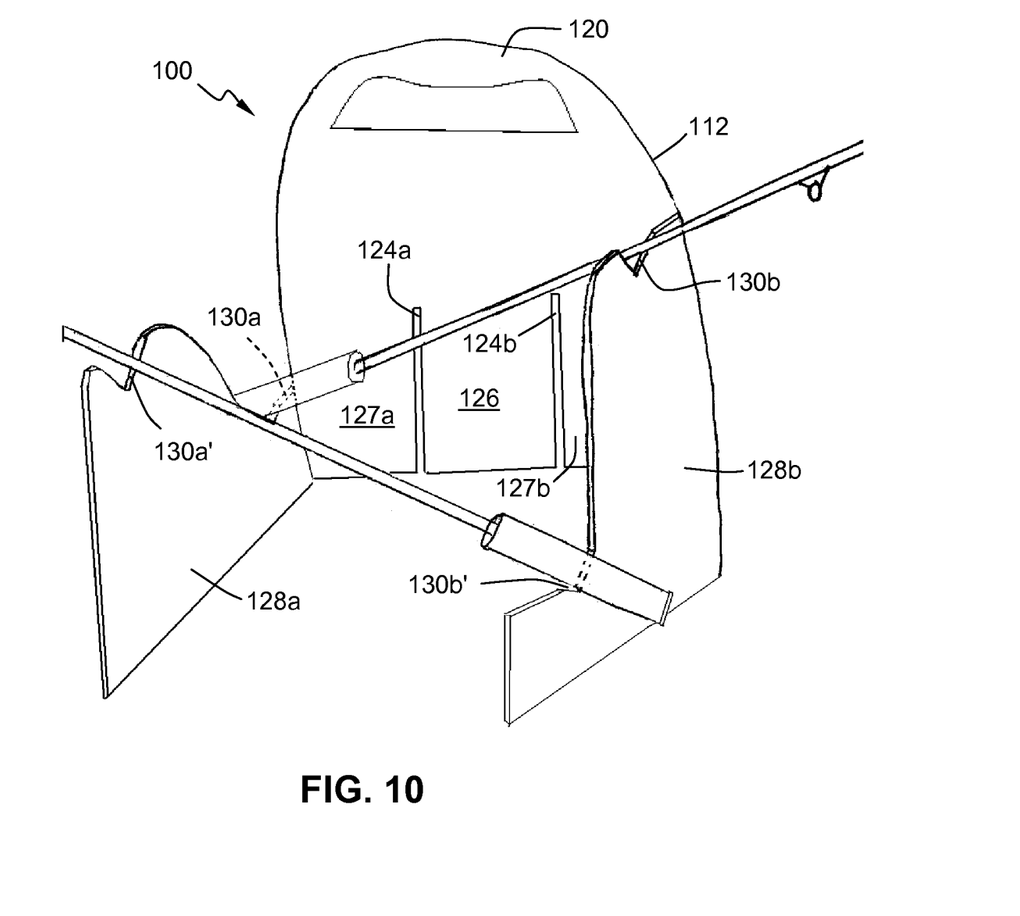
FIG. 10 is a perspective view of a second embodiment of a fishing rod holder of the present invention, showing bi-directional fishing rod rest points, such that the holder can be attached to either side of the bucket or other container.

Referring now to FIG. 10, there is shown another embodiment of a fishing rod holder of the present invention. A fishing rod holder 100 includes a frame 112, a handle 120, a pair of engagement slots 124a and 124b, an engagement tab 126, a pair of counter tabs 127a and 127b, and a pair of fishing rod support arms 128a and 128b. Support arm 128a contains a pair of open rest points 130a and 130a', and support arm 128b contains a pair of open rest points 130b and 130b'. Rest points 130a and 130b are aligned with each other and rest points 130a' and 130b' are aligned with each other. Rest point 130a is situated lower than rest point 130b (e.g., about 7 inches lower) so that a fishing rod can be supported at an angle and pointed upward and to the right in FIG. 10. There is an opposite arrangement with rest points 130a' and 130b'. Rest point 130a' is higher than rest point 130b' (e.g., about 7 inches higher) so that a fishing rod can be supported at an angle and pointed upward and to the left in FIG. 10. Thus, support arms 128a, 128b provide a bi-directional support capability for the fishing rod, which gives holder 100 the enhanced utility of being able to function on either side of a fishing bucket or other container.

Figure 11:
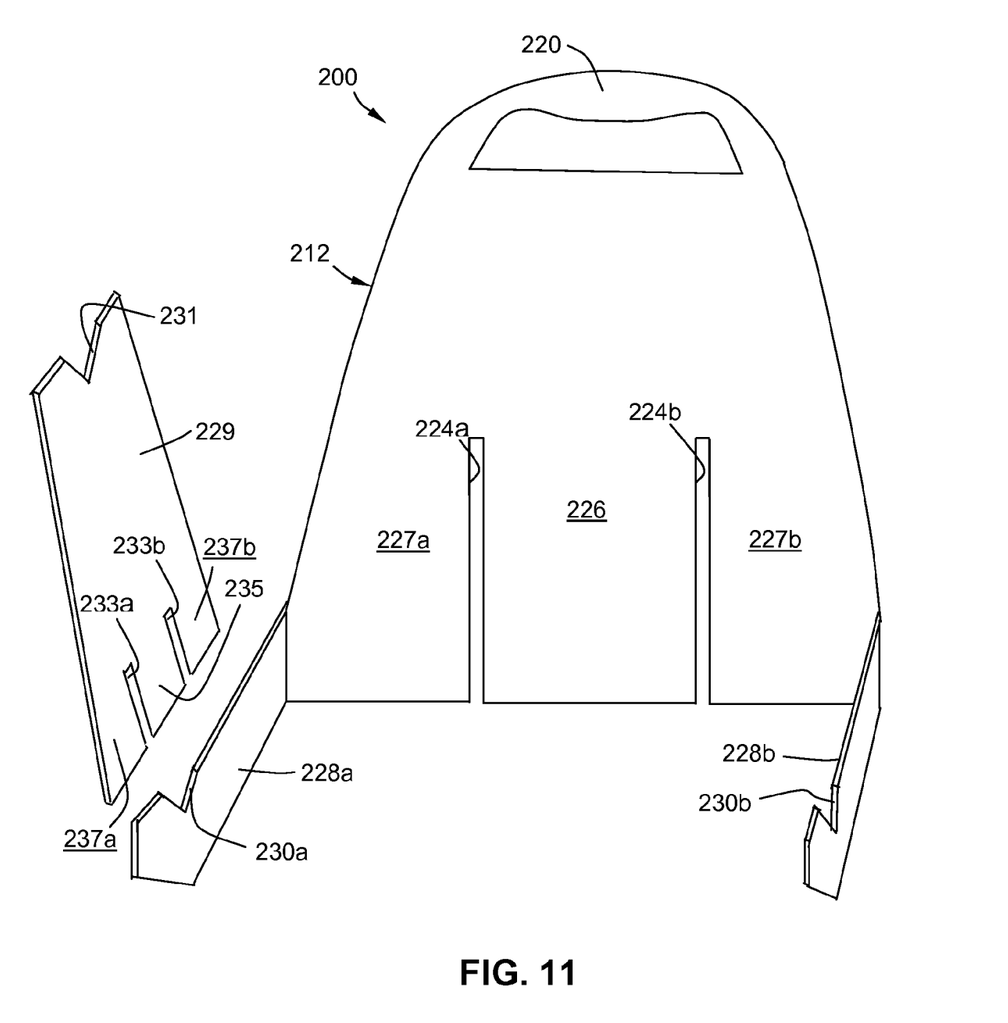
FIG. 11 is a slight perspective view of a third embodiment of a fishing rod holder of the present invention, showing bi-directional fishing rod support capability.

Referring now to FIG. 11, there is shown a further embodiment of a fishing rod holder of the present invention. A fishing rod holder 200 includes a frame 212, a handle 220, a pair of engagement slots 224a and 224b, an engagement tab 226, a pair of counter tabs 227a and 227b, and a pair of fishing rod support arms 228a and 228b. Support arm 228a contains an open rest points 230a and support arm 228b contains an open rest point 230b. Rest points 230a and 230b are aligned with each other, and both are situated at the same level and in a low position relative to frame 212. A support post 229 contains an open rest point 231 and is used to establish an upper rest point for the fishing rod. Thus, holder 200 comprises two separate parts. Post 229 contains its own pair of engagement slots 233a and 233b, which define an engagement tab 235 and counter tabs 237a and 237b. Post 229 can be removably attached to either support arm 228a and 228b in the same manner as holder 10 (FIGS. 2-3) or holder 60 (FIGS. 7A-7C) are attached to a bucket. Slots 233a, 233b of post 229 are aligned with the top edge of support arm 228a (or 228b), and the slots are made to slidably engage the support arm upon application of a downward force. As post 229 is pushed down onto the support arm, engagement tab 235 deflects and slides down one side of the support arm and counter tabs 237a, 237b slide down the other side the arm. The result is a secure attachment of post 229 to the support arm. When post 229 is properly attached to one support arm, rest point 231 is aligned with the rest point in the other support arm. For example, if post 229 is attached to support arm 228a, rest point 231 is aligned with rest point 230b of arm 228b. In this case, the fishing rod would be supported on an upper open rest point (231) and a lower open rest point (230b), and holder 200 would be configured as a "left-handed" holder similar to holder 10 in FIG. 1 (i.e., to be attached to the left side of a bucket, as viewed from behind the bucket). If post 229 is attached to support arm 228b, rest point 231 is aligned with rest point 230a of arm 228a. In the latter case, the fishing rod would be supported on upper rest point 231 and lower rest point 230a, and holder 200 would be configured as a "right-handed" holder similar to holder 10' in FIG. 6 (i.e., to be attached to the right side of a bucket, as viewed from behind the bucket). Accordingly, post 229 provides a bi-directional support capability to holder 200.

Figure 12:
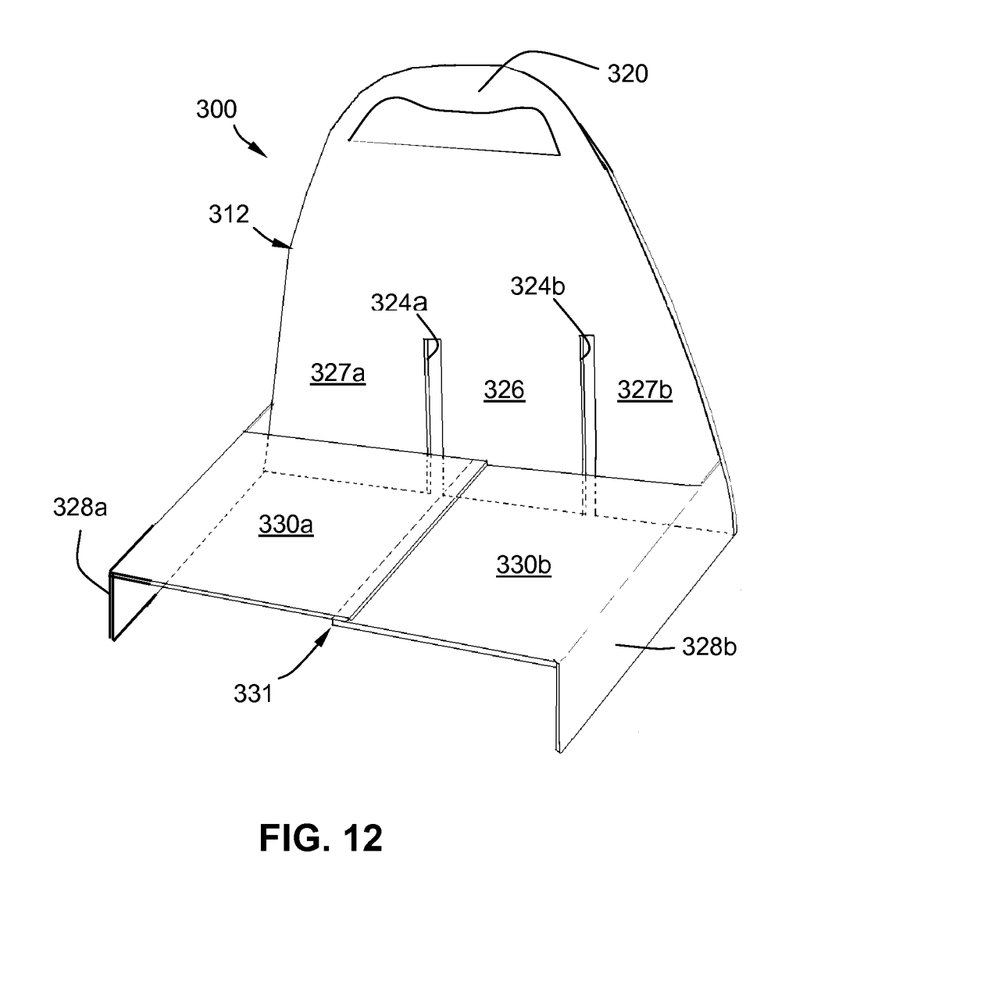
FIG. 12 is a perspective view of a general implement holder of the present invention, including a tray or shelf for supporting general implements such as, e.g., equipment, tools, and hardware.

Referring now to FIG. 12, there is shown another embodiment of an implement holder of the present invention. An implement holder 300 includes a frame 312, a handle 320, a pair of engagement slots 324a and 324b, an engagement tab 326, a pair of counter tabs 327a and 327b, and a pair of support arms 328a and 328b. Extending from support arms 328a and 328b are panels 330a and 330b, respectively. Support arm 328a and panel 330a are one integral piece and panel 330a is bent over at a right angle to arm 328a. Similarly, arm 328b and panel 330b are one integral piece and panel 330b is bent at a right angle to arm 328b. Panel 330a slightly overlaps panel 330b to form a utility tray or shelf 331. Arms 328a, 328b, panels 330a, 330b and frame 312 are all one integral piece of sheet material. Holder 300 is removably attached to a container in the same manner as described with respect to holders 10 and 60 (see FIGS. 2, 3 & 7A-7C).

Among the various embodiments of the present invention described above, the following features and advantages are intended: (1) a utility holder that removably attaches to a container such as, for example, a bucket, pail or tray; (2) the holder has an attachment mechanism that engages the rim of the container and easily and securely, removably attaches the holder to the container; (3) the holder has an attachment mechanism that removably attaches the holder to the container without having to modify or otherwise alter the container; (4) the holder supports an implement such that the implement clears the opening of the container and does not interfere with the opening; (5) in one embodiment, the holder is made of a single piece of sheet material and formed as a single part, and requires no other parts or any hardware for use; (6) in one embodiment, the holder provides at least two open rest points for the implement, such that the implement can be manually placed in or lifted from the holder without manipulation of the implement or interference from the holder's structure; (7) in one embodiment, the holder provides at least one implement rest point that is in the form of a v-shaped notch, which allows a fishing pole strung with fishing line to rest in the notch without interfering with the fishing line extending through the notch; (8) in one embodiment, the holder includes a handle that allows easy manipulation of the holder while attaching or removing the holder from a container; and (9) in one embodiment, the holder supports other accessories, such as, for example, a cup-holder, tool tray, bait box, tackle tray, or minnow pail.

The term "implement" as used in this specification (including the claims) is intended to be used in its broadest sense and to encompass any article used in some activity, especially instruments, tools, utensils, equipment, appliances, fixtures, fasteners and other hardware, accessories, accoutrements, and the like.

While the preferred embodiments of the invention have been particularly described in the specification and illustrated in the drawing, it should be understood that the invention is not so limited. Many modifications, equivalents and adaptations of the invention will become apparent to those skilled in the art without departing from the spirit and scope of the invention, as defined in the appended claims.

What I claim is:

1. A fishing rod holder that removably attaches to a container, the container including a wall having first and second opposing sides, the wall terminating at a rim which at least partially defines an opening to the container, said fishing rod holder comprising:
    (a) a frame having a bottom edge and containing a pair of elongated slots open at the bottom edge, the pair of slots defining an engagement tab therebetween and a pair of counter tabs spaced apart by the engagement tab and the pair of slots, the engagement tab being a substantially resilient member that flexes in response to a force applied between the bottom edge of said frame and the rim of the container, the flex of the engagement tab allowing said frame to slidably engage the wall of the container along the pair of slots until said frame becomes removably attached to the container in a fixed position, in which the engagement tab is biased against the first side of the wall and the pair of counter tabs is biased against the second side of the wall; and
    (b) a support connected to said frame and configured to support a fishing rod when said frame is removably attached to the container in the fixed position,
    said support including first and second support arms cantilevered from said frame in spaced-apart relation, each of the support arms containing a substantially open rest point, positioned a distance away from said frame, for receiving and supporting a portion of the fishing rod,
    the first support arm being positioned on said frame a first distance from the bottom edge of said frame and the second support arm being positioned on said frame a second distance from the bottom edge of said frame, the first distance being greater than the second distance, such that the fishing rod is supported at an angle by the first and the second arms when said frame is removably attached to the container in the fixed position.

2. The fishing rod holder of claim 1, wherein said frame is generally flat.

3. The fishing rod holder of claim 1, wherein said frame is made of a generally flat sheet of metal.

4. The fishing rod holder of claim 1, wherein said frame is made of a generally flat sheet of plastic.

5. The fishing rod holder of claim 1, wherein said support is integrally connected to said frame.

6. The fishing rod holder of claim 1, wherein the rest points of the support arms are aligned with each other.

7. The fishing rod holder of claim 1, wherein at least one of the rest points of the first and the second support arms is in a form of a substantially v-shaped notch.

8. The fishing rod holder of claim 7, wherein the notch is defined by first and second slopes and a depth, the length of the first and the second slopes being about one inch and the depth of the notch being about three-quarters of an inch.

9. The fishing rod holder of claim 1, wherein the first and the second support arms project away from the container when said frame is removably attached to the container in the fixed position, such that the fishing rod clears the opening of the container when being supported by the arms.

10. The fishing rod holder of claim 1, further comprising an accessory having means for removably coupling to said frame or said support.

* * * * *

UNITED STATES PATENT AND TRADEMARK OFFICE
CERTIFICATE OF CORRECTION

| | | |
|---|---|---|
| PATENT NO. | : 9,474,263 B2 | Page 1 of 1 |
| APPLICATION NO. | : 14/693002 | |
| DATED | : October 25, 2016 | |
| INVENTOR(S) | : Christopher M. Roberts | |

It is certified that error appears in the above-identified patent and that said Letters Patent is hereby corrected as shown below:

In the Claims

Column 10,

Lines 17-24, cancel the following text in claim 1

"the first support arm being positioned on said frame a first distance from the bottom edge of said frame and the second support arm being positioned on said frame a second distance from the bottom edge of said frame, the first distance being greater than the second distance, such that the fishing rod is supported at an angle by the first and the second arms when said frame is removably attached to the container in the fixed position."

and, in its place, insert the following text in claim 1

--the first support arm being positioned higher on said frame than the second support arm such that the fishing rod is supported at an angle by the first and the second support arms when said frame is removably attached to the container in the fixed position.--

Signed and Sealed this
Sixth Day of December, 2016

Michelle K. Lee
*Director of the United States Patent and Trademark Office*